May 10, 1932.  J. G. GUEOVJIAN  1,858,011
HALFTONE SCREEN
Filed Feb. 5, 1930

John G. Gueovjian INVENTOR
BY
Harold Kaplan ATTORNEY

Patented May 10, 1932

1,858,011

UNITED STATES PATENT OFFICE

JOHN G. GUEOVJIAN, OF NEW YORK, N. Y.

HALFTONE SCREEN

Application filed February 5, 1930. Serial No. 425,969.

My present invention relates to half-tone screens used in the photo-mechanical reproduction of tone subjects, such as photographs, wash drawings and paintings, and more particularly to screens used in the camera for making half-tone negatives from which printing plates are made photo-mechanically.

One of the objects of the present invention is to provide a half-tone screen suitable for making negatives for printing plates in photo-engraving and allied arts. Another object of the present invention is to provide a half-tone screen which will have the effect of producing a clearer and more distinct print. Still a further object of the present invention is to produce half-tone prints having a novel and unique appearance and a pleasing effect on the eye. Other objects and advantages of the present invention will in part be pointed out in detail hereinafter and will in part be apparent to those skilled in the art to which the present invention relates.

With the above and other objects in view, the present invention consists of the novel construction, combination and arrangement of parts as hereinafter more specifically described and illustrated in the accompanying drawings wherein is shown an embodiment of my present invention. It is however, to be understood that my invention is not limited to the specific embodiment thereof herein shown for purposes of illustration only.

At present the great majority of half-tones are made from cross-lined screens, obtained by cementing together two transparent plates of glass, the inner surfaces of which are ruled with uniformly spaced parallel lines forming an opaque mesh or grating. The two plates are superimposed in such a manner that the lines on one plate cross the lines on the other plate at right angles. The resulting pattern is made up of small transparent squares, each of which is surrounded by an opaque area. Other screens now in use have an opaque grating consisting of lines of regular outline and uniform spacing and thickness. The regularity in the construction of the ordinary screens just described results in a pattern which causes the prints to have a somewhat mechanical appearance.

The screen of the present invention obviates the mechanical appearance of the half-tone pattern produced by the ordinary screen, and produces a novel and unique pattern which is very attractive and pleasing to the eye. The screen of the present invention also retains in a remarkable and unusual degree the highlights and deep shadows and reproduces the gradations in tone of the original subject most accurately. It also has the effect of producing from an ordinary pen and ink, or wash drawing, or other prints, a negative which can be produced only from a highly artistic drawing, and a consequent saving in time to the artist in making the original. Practical tests with the screen of my present invention, as distinguished from the ordinary make of screens, have shown that a superior quality of negative may be produced thereby.

I shall now describe an illustrative embodiment of the present invention, reference being had to the accompanying drawings forming a part of this specification.

Figure 1:
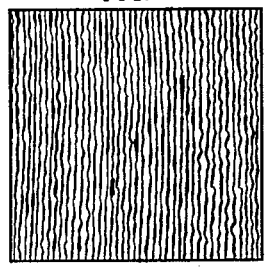
Fig. 1 represents a front view of a half-tone screen embodying my present invention.
Figure 2:
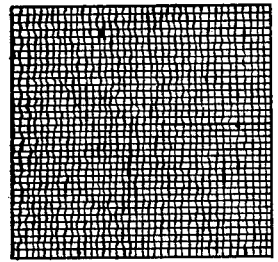
Fig. 2 represents a front view of a half-tone screen showing a modified embodiment of my present invention.

My present invention is a digression from the regular and mechanical pattern formations produced by the ordinary screens, and is a departure from the conventional forms of half-tone screens. The outline produced by the screen of my present invention is novel, unique, and irregular. In Fig. 1 I have shown a screen constructed in accordance with the principle of my invention. It will be seen by reference to Fig. 1 that the lines have a freehand, and unconstrained delineation and the pattern formed thereby is of no definite geometrical form. As indicated hereinabove the effect of such a construction in half-tone screens is to produce from an ordinary photograph, wash drawing or other prints, a negative which can be produced only from a highly artistic drawing. In addition a novel and attractive screen pattern is produced which is very pleasing to the eye. In Fig. 2 I have illustrated an embodiment of my present invention used in combination with one of the regular and ordinary screen structures. In this illustration, the horizontal lines are perfectly straight and uniformly spaced, whereas the vertical lines are arbitrary and irregular.

Although the preferred embodiments of my invention are as illustrated and described, yet I desire it to be understood that changes in the details of construction can be had which will fall within the scope of my invention as claimed.

What I claim is:

1. A half-tone screen comprising two superposed plates of transparent material, one carrying upon its inner surface a plurality of lines of opaque material each line having an irregular course and arbitrarily spaced from any of its adjacent lines.

2. A half-tone screen comprising two superposed plates of transparent material, each of which carrying upon its inner surface a plurality of lines of opaque material, each line having an irregular course and arbitrarily spaced from any of its adjacent lines the lines on each plate running in the same general direction.

3. A half-tone screen comprising two superposed plates of transparent material, one of which carrying upon its inner surface a plurality of lines of opaque material, each line having an irregular course and arbitrarily spaced from any of its adjacent lines, and the other carrying upon its inner surface a plurality of ruled parallel lines of opaque material equally spaced from each other, the lines on one plate running transversely to the lines on the other plate.

4. A half-tone screen comprising two superposed plates of transparent material, each of which carrying upon its inner surface a plurality of lines of opaque material, each line having an irregular course and arbitrarily spaced from any of its adjacent lines, the lines on one plate running transversely to the lines on the other plate.

In witness whereof, I have signed my name to this specification this 31 day of January, 1930.

JOHN G. GUEOVJIAN.